Aug. 23, 1932.   G. D. LYLES ET AL   1,873,653
CLOSURE FASTENER
Filed Aug. 19, 1931   3 Sheets-Sheet 1
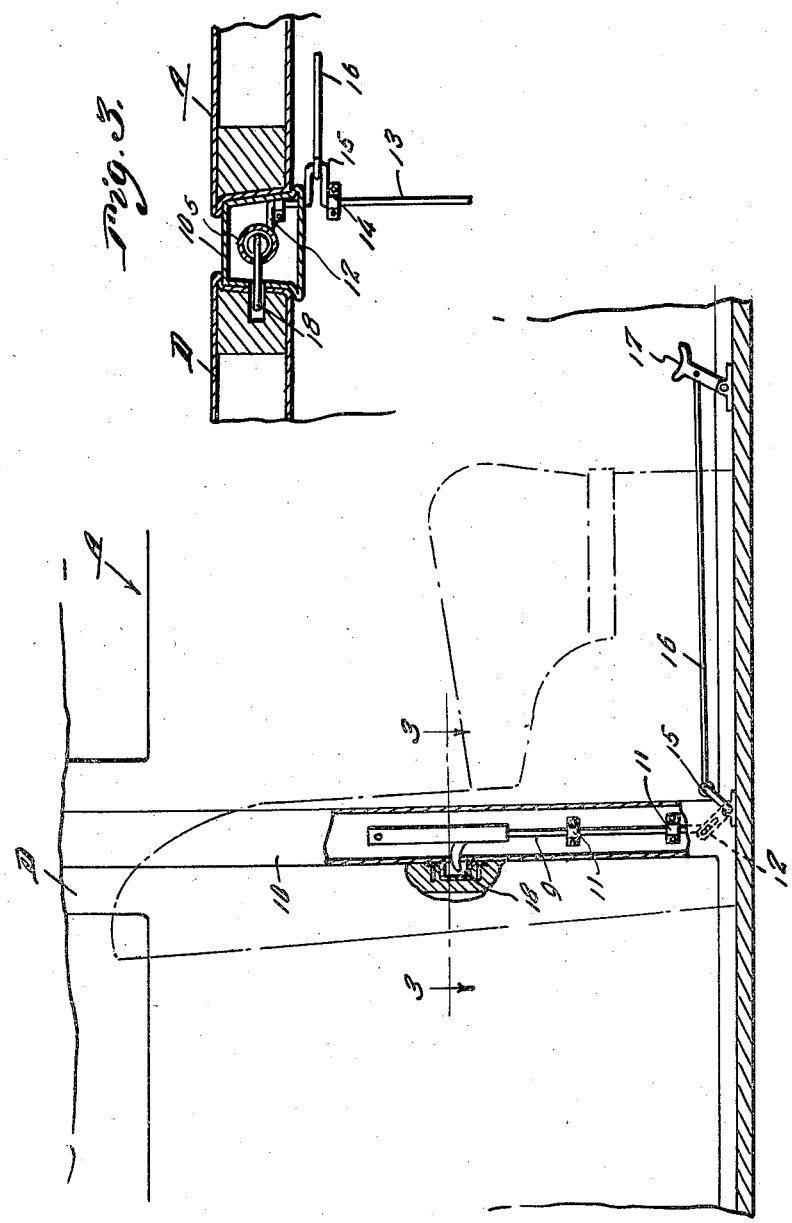
Inventors
G. D. Lyles
F. M. Lyles
By Clarence A. O'Brien
Attorney

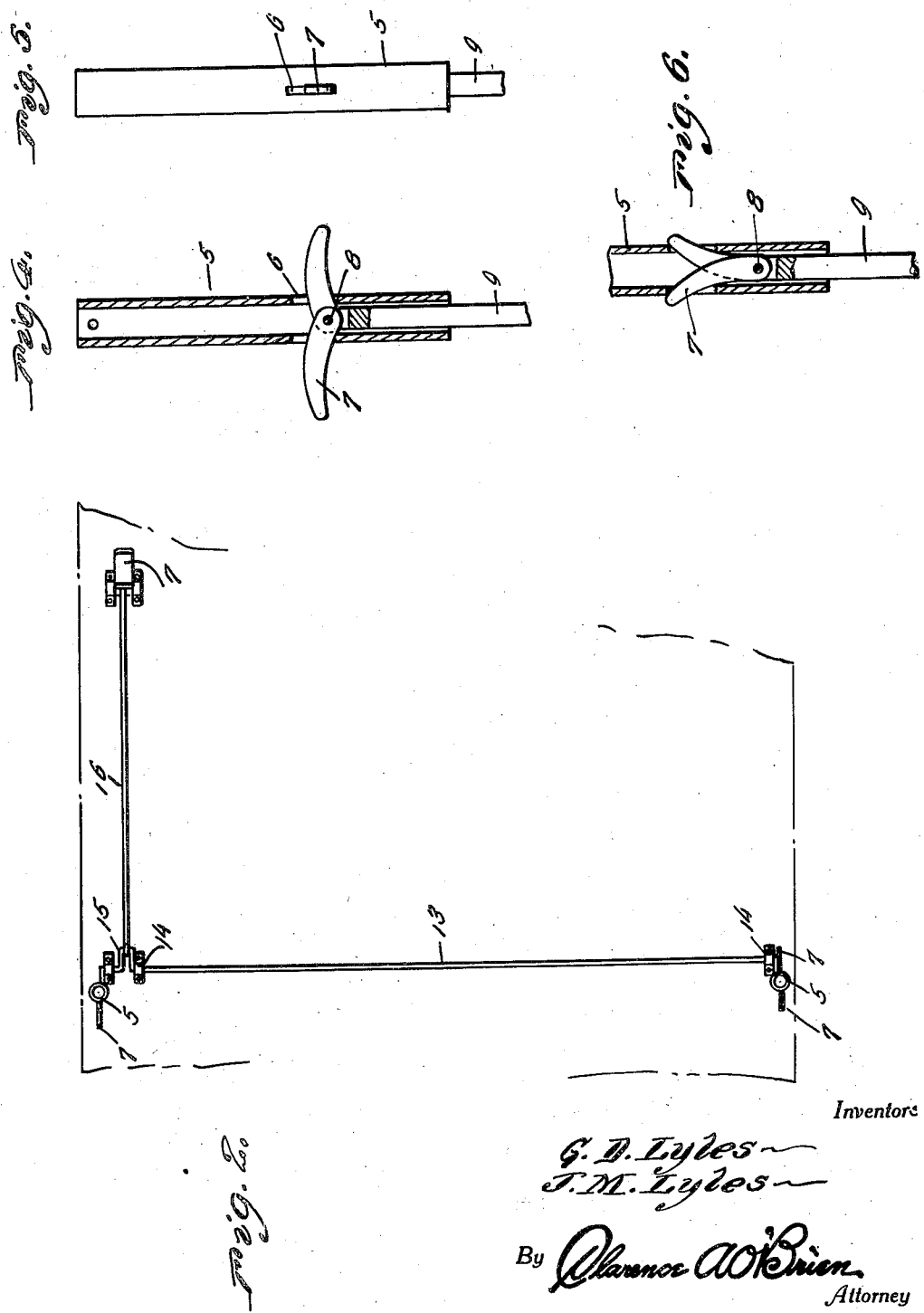

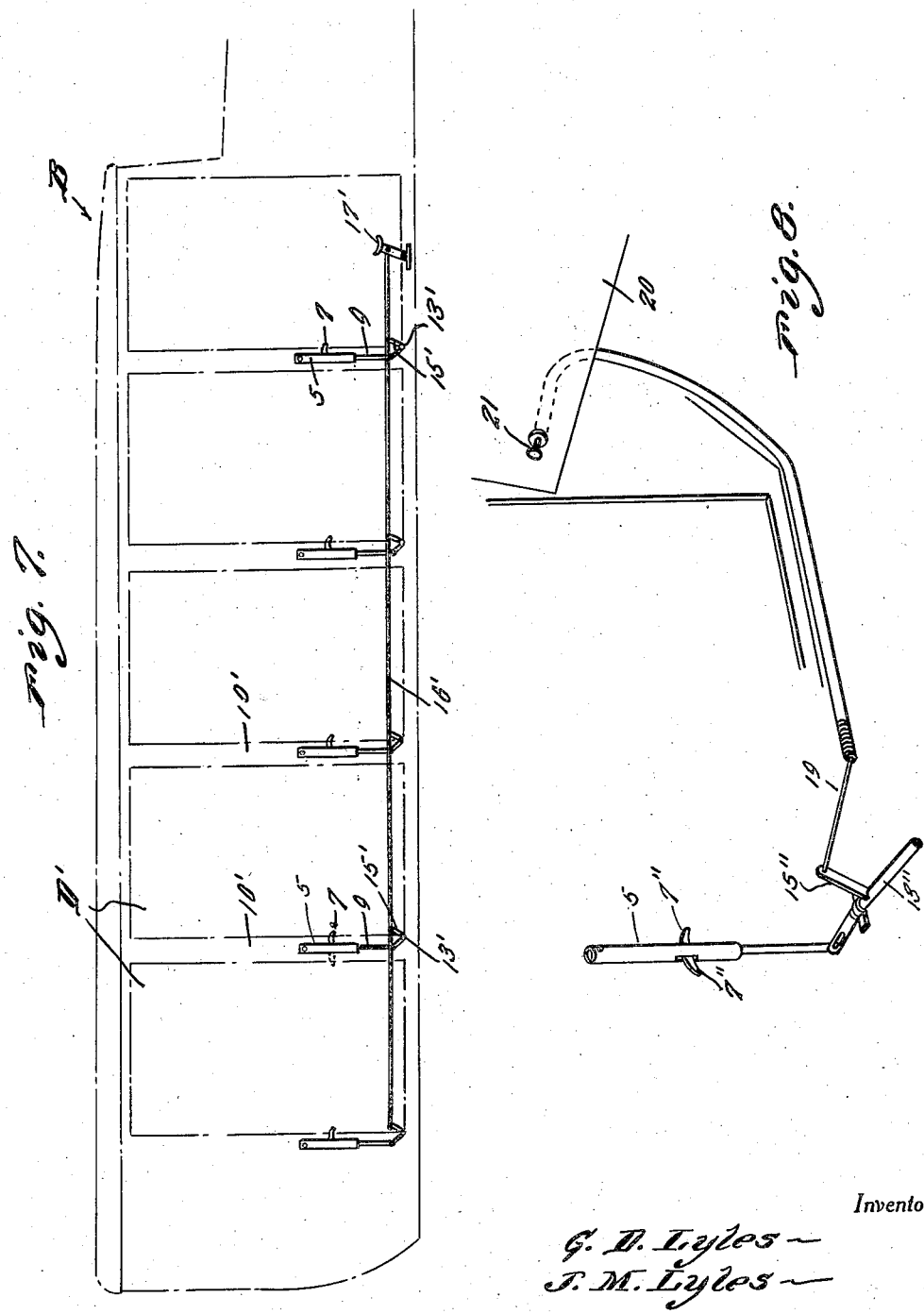

Patented Aug. 23, 1932

1,873,653

UNITED STATES PATENT OFFICE

GEORGE DEWEY LYLES AND JESSE M. LYLES, OF STATESVILLE, NORTH CAROLINA, ASSIGNORS, BY DIRECT AND MESNE ASSIGNMENTS, OF ONE-HALF TO SAID GEORGE DEWEY LYLES AND ONE-HALF TO H. H. YOUNT, OF STATESVILLE, NORTH CAROLINA

CLOSURE FASTENER

Application filed August 19, 1931. Serial No. 558,173.

This invention relates to certain new and useful improvements in closure fasteners, the primary object of this invention being to provide means whereby a plurality of doors may be simultaneously locked or unlocked as found desirable.

A further object of the invention is to provide a locking means for the doors of motor buses and automobiles such as "sedans", and like vehicles wherein the vehicle is provided on one or both sides thereof with a plurality of doors whereby all the doors may be simultaneously locked or unlocked thus providing a safety device against unauthorized opening of the doors.

Other objects and advantages of the invention will become apparent from a study of the following description, taken in connection with the accompanying drawings, wherein:

Figure 1 is a fragmentary sectional elevational view through a conventional type of automobile, such as a sedan showing the application of the invention thereto for locking the rear doors of the sedan.

Figure 2 is a diagrammatic plan view of the locking device shown in Figure 1.

Figure 3 is a fragmentary detail sectional elevational view taken substantially on the line 3—3 of Figure 1.

Figure 4 is a fragmentary longitudinal sectional view showing the tube, guide rod and locking bolts associated therewith, the bolts being shown in a projected position.

Figure 5 is an elevational view of the structure shown in Figure 4, and at right angles thereto.

Figure 6 is a view similar to Figure 4, the bolts being shown in a retracted position.

Figure 7 is a somewhat diagrammatic and elevational view showing the application of the invention to a motor bus.

Figure 8 is a perspective view of a slightly modified form of the invention.

With reference more in detail to the drawings, it will be seen that the locking device, in the main, consists in the provision of a tube 5 provided with oppositely disposed openings 6 through which are projectable and retractible longitudinally curved locking bolts 7. The bolts 7 at the inner or corresponding ends are pivoted as at 8 to the upper end of a rod 9 vertically movable relative to the sleeve 5 and having its upper end arranged within the sleeve.

As shown in Figures 1 to 3 inclusive, when applying the locking device to an automobile, a portion of which is shown in Figure 1 and designated generally by the reference character A, a tube 5 is vertically mounted in any suitable manner within the stile 10 at one side of the automobile, and the lower portion of the rod 9 is slidable through vertically spaced guide brackets 11 arranged within the lower portion of the stile. The lower end of the rod 9 has a pin and slot connection 12 with a crank arm on one end of a crank shaft 13 extending transversely of the vehicle between the stiles 10 and mounted in brackets 14.

Adjacent one end thereof, the shaft 13 is equipped with a throw or crank 15 that has a link connection 16 with a pedal 17 suitably mounted in the driver's compartment of the automobile within convenient reach of the foot of the driver.

When the invention is applied to an automobile in the manner just described, it will be noted that each rod 9 is provided with but a single bolt 7 that is projectable through an opening 6, and through a suitable opening in the stile 10 for reception within a keeper socket 18 provided in the free vertical edge of the door D.

From what has been herein stated, it will be apparent that when the rear doors D of the automobile are closed, the bolts 7 will be projected through the openings 6, through the stile, and engaged at their outer free ends with the keeper socket 18. The doors D are thus retained in locked position and cannot be opened by one in the rear compartment of the automobile. Obviously, to unlock the doors D, the occupant of the driver's compartment, usually the operator of the vehicle, will, with his foot, press downwardly and forwardly on the pedal 17 thus rocking the shaft 13 drawing the rod 19 downwardly with the result that the bolts 7 are drawn inwardly to the position shown in Figure 6, out of engagement with the keeper socket 18 whereupon the doors D are unlocked and are free to be swung to an open position.

In Figure 7, I have shown the invention as applied to a motor passenger bus B, the same being provided on each side thereof with a plurality of doors D'. In this instance, the tubes are mounted in the stiles 10', and both bolts 7 may be used in the event the doors are so hinged as to have each stile 10 constitute a jamb for two adjacent doors, whereupon it will be apparent that one locking device may be used for locking two doors. However, in the event each door is hinged to a single stile, but one bolt 7 will be employed with each locking device as is thought apparent.

In Figure 7, I have shown but one bolt 7 used with each locking device, and each transverse rocking shaft 13' connecting opposed locking devices is provided with a crank arm 15' having pivotal connection with a connector rod or control rod 16' that, at its forward end, is connected to the pivoted pedal 17' located in the driver's compartment of the motor bus.

In that form of the invention shown in Figure 8, instead of employing a link or rod 16, such as shown in Figure 2, there is employed a Bowden wire 19 connected at one end to a crank 15'' provided on the shaft 13''. The free end of the Bowden wire and its casing extends forwardly of the driving compartment and upwardly and then rearwardly through the instrument board 20 and is provided with an actuating knob 21. Obviously by pulling on the knob 21 the shaft 13'' will be rocked for retracting the lock bolts 7''.

From the foregoing it will be seen that we have provided a practical and efficient locking device whereby a plurality of doors of an automobile, motor bus, or the like, may be effectively locked, and can be opened only from an occupant of one compartment of the automobile, bus, or the like, and which is also operable to effect an unlocking of all the doors simultaneously, as well as a locking thereof.

It is also apparent that such a locking device may be applied to the doors of the automobile, bus, or the like vehicle without in any wise interfering with the usual door locks provided.

Even though we have herein shown and described the preferred embodiments of the invention, it is to be understood that the invention is susceptible of further changes, modifications, and improvements coming within the scope of the appended claims.

What is claimed is:

1. A door locking device for locking a plurality of doors to a door stile including in combination a horizontally actuated member, a casing adapted to be mounted in the door stile, a rod slidable vertically in said casing, means including a loose connection for connecting said horizontally actuated member with said rod and adapted to impart vertical movement to said rod when actuated, a pivot mounted on said rod, a plurality of curved bolts mounted on said pivot and projecting in opposite directions and adapted when actuated to lock said doors.

2. In a device of the class described for locking a door to a door stile, a rod located in another plane than the plane of the door and stile, means for actuating said rod, a crank attached to said rod and located in the plane of said rod, a second rod adapted to be mounted on said door stile, said crank having a slot and pin connection with said last-named rod whereby upon actuation of said crank by said rod first-named, said second rod will receive vertical movement only, and a curved bolt pivotally mounted upon said second rod and adapted upon vertical movement thereof to enter a recess in the door and prevent opening thereof.

In testimony whereof we affix our signatures.

GEORGE DEWEY LYLES.
JESSE M. LYLES.